INVENTOR.
EVERETT E. McCOWN
ATTORNEYS

United States Patent Office 3,497,616
Patented Feb. 24, 1970

3,497,616
CATHODE RAY TUBE MODULATION SYSTEM
Everett E. McCown, San Diego, Calif., assignor to the United States of America as represented by the Secretary of the Navy
Continuation-in-part of application Ser. No. 391,817, Aug. 24, 1964. This application Nov. 21, 1968, Ser. No. 777,782
Int. Cl. H04n 3/16, 5/44
U.S. Cl. 178—7.5                    5 Claims

ABSTRACT OF THE DISCLOSURE

The modulation contained in electrical signals of a relatively low potential signal source is transmitted non-electrically to modulate a very high potential source of as much as 40,000 volts. A first transducer converts the low-level electrical signals to commensurately modulated signals of radiant energy which may be within the infrared spectrum. A radiant energy transmitting path has one end positioned to receive the modulated signals and a second transducer is positioned at the terminal end of the radiant energy transmitting path, receiving the modulated signals of radiant energy for conversion to electrical signals which modulate the high potential of the input circuit, maintaining inductive, capacitive, and electrical isolation from the low-level signal source.

STATEMENT OF GOVERNMENT INTEREST

The invention described herein may be manufactured and use by or for the Government of the United States of America for governmental purposes without the payment of any royalites thereon or therefor.

CROSS-REFERENCE TO RELATED APPLICATION

This patent application is a continuation-in-part of copending patent application, Ser. No. 391,817, now abandoned, titled: "Fiber Optics CRT Intensity Coupler," filed Aug. 24, 1964, in the name of Everett E. McCown.

BACKGROUND OF THE INVENTION

Considerable difficulties have been encountered in prior art arrangement for transmitting electrical signals from a relatively low-level signal source to modulate a very high potential input circuit. For example, in the use of cathode ray tubes for applications such as large screen projection displays, a relatively high potential must be employed which may be of the order of 40,000 volts. If such a high potential is imposed upon the anode of a cathode ray tube, the interior of the tube envelope, together with its exterior, will function substantially in the manner of a large capacitor and will have sufficient capacitive properties to degrade and impair the resolution of displays which are depicted on the face of the tube. Accordingly, it may be highly desirable to operate the anode of a projection cathode ray tube at substantially ground potential while operating the cathode and/or another control electrode, such as a first or second grid of the cathode ray tube at a negative potential of as much as 40,000 volts. Since either the cathode of the cathode ray tube or its grid may be used as a control electrode, such electrodes, when so employed, must accordingly be operated at a quiescent point of approximately 40,000 volts negative potential.

Generally, prior art systems have employed either capacitive coupling or electromagnetic coupling for signal transmission between the low-level signal source and the very high potential input circuit. If capacitive coupling is employed, the extremely broadband signals, which it is desirable to transmit in radar video systems, pose a major problem. Typically, radar video may require an extreme bandwidth of from 20 cycles per second to as high as 30 megacycles per second.

In attempting to adequately meet the problem of providing an extremely broad bandwidth of this order, relatively large capacitive values must be employed in the signal transmission system. As will be readily appreciated, the relatively very large capacitive values become highly charged due to the extremely large potential differences across the capacitors and a substantial charge may remain across the capacitors when the apparatus is turned off. If the apparatus is again turned on before the charges have had ample time to drain off, the capacitor will discharge into the associated circuit and may thus cause serious and expensive damage.

Moreover, the employment of large condensers leads to undesirable transient phenomena and the use of high impedance capacitors accentuates cathode ray tube leakage problems which might be otherwise minimized by a relatively low impedance output coupling circuit.

Additionally, because of the large capacitance required in the use of capacitive coupling, the time response of the circuitry is inclined to be relatively slow so that a very high frequency signal, i.e., a signal of high intensity, but short duration, may be badly obscured by reason of the charge which may remain on the capacitors due to previous relatively lower frequency signals. Consequently, the control electrode of a cathode ray tube, operating at a very high potential and capacitively coupled to a low-level input signal source, does not return rapidly to its quiescent DC state because of the charge remaining on the large capacitive values employed for coupling. Attempts have been made to remedy this problem by DC restoration.

However, in contrast to DC restoration as effected in television applications during sweep flyback periods, practical radar systems customarily employ flyback time to accomplish other functions. For instance, a tactical radar presentation may employ the radar flyback time to generate symbols representing correlated information such as targets. Accordingly, effective DC restoration cannot always be accomplished in tactical information display systems as conveniently as DC restoration may be effected in commercial television systems. Thus, the problem of DC restoration which is imposed by the charge remaining on large capacitors is not susceptible to a convenient and ready solution in tractical radar systems.

In other known prior art systems, electromagnetic coupling has been effected between a relatively low-level signal source and a very high potential input circuit such as may be found in a cathode ray tube projection system. This has been accomplished by transformer coupling appropriately employed to electrically isolate the input signal source from the high potential or the control electrode of the cathode ray tube. However, as will be readily appreciated by those conversant with the art, electromagnetic coupling inherently involves the use of transformers which have the undesirable characteristics of being bulky, and heavy circuit elements. Additionally, electromagnetic coupling poses the problem of achieving high efficiency transfer of the signals over an extremely broad bandwidth since most transformer coupling applications necessarily represent a compromise between linearity, bandwidth requirements and other pertinent factors.

SUMMARY OF THE INVENTION

The present invention is directed to a signal transmission system for modulating a very high potential input circuit which may operate at an amplitude of as much as 40,000 volts. The particular problem to which the present invention is directed is that of compiling a source of electrical signals which are modulated about a relatively very low-level potential for producing a commensurately modulated signal which is operative about a very high potential where the potential difference between the source of electrical signals and the high potential input circuit may be as much as 40,000 volts. The present invention employs a first transducer operative at the low-level potential for converting the source of electrical signals to commensurately modulated signals of radiant energy which may be within the infrared spectrum. A radiant energy path is provided for transmitting the modulated radiant energy signals from the first transducer to a second transducer which is operative at the very high potential of the input circuit. The second transducer is arranged to receive the modulated radiant energy signals and produce commensurate modulation at the high-level potential connected to the very high potential input circuit.

In a typical application of the present invention, the source of modulated electrical signals may be radio or video, and the very high potential input circuit may be the control electrode of a cathode ray tube of the projection type for large scale tactical displays. The input circuit may comprise the cathode or the control grid of a cathode ray tube operated, for example, at a negative potential of 40,000 volts while the anode of the cathode ray tube is operated at substantially ground potential for reasons mentioned hereinbefore. In a preferred embodiment of the present invention, a first transducer may be employed which transforms modulated electrical signals to commensurate infrared signals and transmitted along a path to a second transducer which receives the modulated infrared signals and is operative at the very high potential of a negative 40,000 volts to function, in effect, as a part of the input circuit of a projection cathode ray tube of the type described.

Accordingly, it is the primary object of the present invention to provide a significantly improved signal transmission system for modulating a very high potential input circuit with modulation signals derived from a relatively low-level potential signal source.

Another most important object of the present invention is to eliminate the shortcomings and disadvantages of capacitive and electromagnetic coupling employed in signal transmission systems of the prior art.

A further object of the present invention is to obviate the need for DC restoration circuits as necessitated by prior art capacitive coupling signal transmission systems.

Yet a further object of the present invention is to provide an improved signal transmission system which effects complete electrical, capacitive, and electromagnetic isolation of a very high potential input circuit relative to a source of relatively very low-level potential modulated signals.

A further object of the present invention is to provide an improved signal transmission system for isolating such circuits of substantial potential differences and having improved transient and bandwidth characteristics.

These and other features, advantages, and objects of the present invention will be more clearly understood from the following description of a preferred embodiment of the present invention together with the accompanying drawings.

DESCRIPTION OF THE PREFERRED EMBODIMENT

Figure 1:
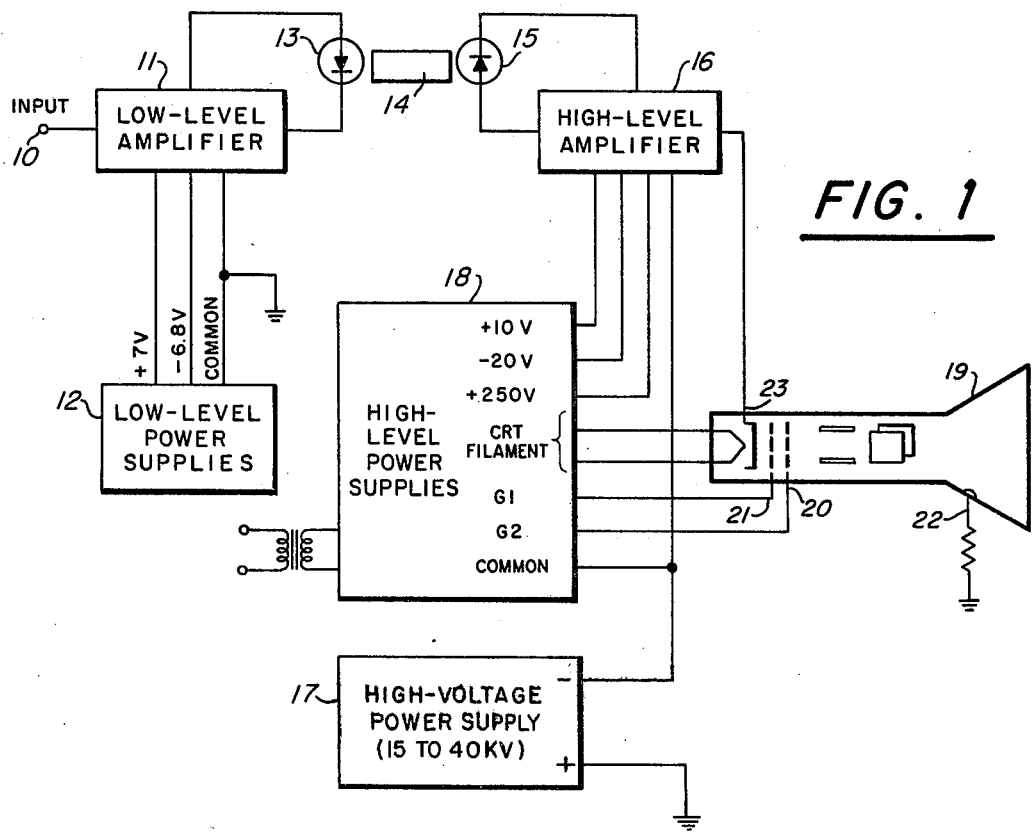
FIG. 1 is a preferred embodiment of the present invention.

A preferred embodiment of the system of the present invention is illustrated by FIG. 1 in schematic block diagram form. An input signal is received at terminal 10 and may comprise radar data information or symbols if the present invention is employed with a large screen, projection-type tactical display, for example. The input received at terminal 10 is connected to a low-level amplifier 11 which may typically operate at the relatively low-level potentials indicated in FIG. 1 as developed by a conventional low-level power supply 12. The amplified signal output of the low-level amplifier 11 is impressed across a transducer 13.

The transducer 13 may comprise a gallium arsenide electroluminescent diode infrared source, preferably having broad bandwidth capabilities and good transient response. Employing this type of transducer, the electrical input may be converted linearly to a radiant output below the lasing mode responsive to current fluctuations over several milliamperes. In one particular embodiment employing a gallium arsenide diode infrared source, the maximum power dissipation was 1.5 watts.

Employing small area, infrared source diodes, amplitude modulation of the radiant output may be realized at frequencies up to 900 mHz. A radiant energy transmitting path 14 is positioned for one end to receive the radiant energy developed by the first transducer 13. In one embodiment of the present invention, the radiant energy transmission path 14 comprised a bundle of flexible optical fibers of relatively small individual diameter of the order of 0.003 inch and secured together to provide an assembly approximately ⅛ inch in diameter.

In one embodiment of the present invention, the material employed for the radiant energy transmitting path accepted approximately 70% of the infrared radiant energy incident thereon, and attenuated the energy approximately 50% for every 7 feet of length of the path. It will be appreciated, however, that the path should be preferably kept as short as possible, consistent with other considerations of convenience in changing the direction of the transmitting path in accordance with the configuration of the material employed.

The terminal end of the radiant energy transmitting path 14 is positioned adjacent a second transducer 15 which operates to produce an electrical signal commensurate with the radiant energy received from the transmitting path 14. The second transducer 15 may be a silicon photo detector which provides modulation input to a high level amplifier 16.

As will be seen from the schematic diagram of FIG. 1, the high level amplifier 16 and the second transducer 15 are both referenced to a common potential level which may be as high as 40 kilovolts supplied by the high voltage power supply 17. The high voltage power supply 17 is operatively connected to a high level power supply 18 which provide the common reference potential of the order of 15 to 40 kilovolts negative potential. The positive potential of the high voltage power supply 17 is referenced to ground.

The high level power supply 18 furnishes not only the necessary potentials to the high level amplifier 16, but also furnishes the filament current for a cathode ray tube 19, and appropriate potentials as applied to the first and second grids 20 and 21, respectively, of the cathode ray tube 19. Cathode ray tube 19, it will be noted, has its anode 22 operatively connected to ground. Thus the 15 to 40 kilovolts negative potential supplied by the high voltage power supply 17 and received in the high level amplifier 16 is modulated in accordance with the variations in electrical signal developed by the second transducer 15 and applied to the cathode 23 of the cathode ray tube 19. Accordingly, it will be appreciated that the cathode 23 is effectively the control electrode of the cathode ray tube 19. The cathode ray tube 19 is operated so that its anode is substantially at ground potential while the control electrode which may comprise the cathode 23 is at a 15 to 40 kilovolt negative potential to provide the high potential difference required between the control electrode and the anode of the cathode ray tube 19 to cause electron beam flow to impinge upon the face of the cathode ray tube 19 resulting in luminescence of its phosphorous coating.

It should be appreciated, of course, that the cathode ray tube 19 and its control electrode 23 operates at a high amplitude of negative potential which may be established at any desirable level between 15 and 40 kilovolts in accordance with the capability of the high voltage power supply 17 and the most desirable operative characteristics of the particular cathode ray tube 19 employed in the system; the modulation of the high amplitude negative potential varies over a relatively small range of voltage in accordance with the electrical output of the second transducer 15 as amplified by the high level amplifier 16. Thus, it will be seen that the entire input circuit, including the second transducer 15, the high level amplifier 16, and the control electrode 23 of the cathode ray tube 19, all operate at substantially the same extremely high level of negative potential furnished by the high voltage power supply 17. The reasons for this mode of operation will be apparent to those skilled in the art, in that, in order to avoid disadvantages of the prior art as previously described, the anode 22 of the cathode ray tube 19 is preferably operated at substantially ground potential. This avoids, among other disadvantages, the condition where the entire cathode ray tube 19, and more particularly its conductive surface associated with the anode 22 on the interior of the tube, operates in the manner of a large capacitor retaining an extremely high voltage charge.

The technique of employing a first transducer 13 which may, for example, convert electrical input signals to invisible infrared rays of commensurate modulation provides the means of isolating the low-level input signal received at the input terminal 10 from the operative assembly comprising the high level amplifier 16 and the cathode ray tube 19 which it drives, both of which are operated at extremely high amplitude negative potential. The invisible infrared rays generated by the first transducer 13 are transmitted in the form of invisible light energy along an appropriate radiant energy transmitting path 14 to a second transducer 15 where the modulated invisible light energy is reconverted to electrical signals. However, such electrical signals are employed to modulate the high-level, negative potential which may be of the order of 15 to 40 kilovolts.

Accordingly, there is no capacitive, electromagnetic, nor electrical connection between the low-level input circuits and the high-level circuits which drive the cathode ray tube 19; thus, virtually complete isolation is achieved. This avoids the many disadvantages previously described which were associated with prior art systems and also overcomes the undesirable effects of high distributed capacitance-to-ground which are encountered in capacitive coupling systems as well as avoiding electrical cross-talk between circuits. Both of these undesirable conditions tend to increase noise and limit the bandwidth of the systems.

Figure 2:
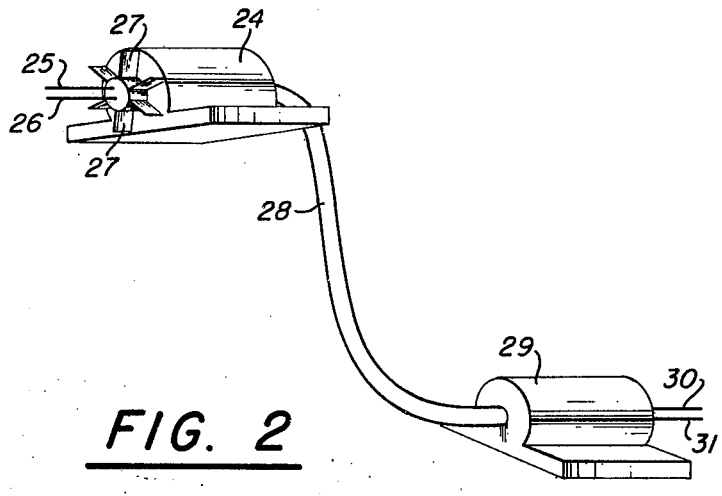
FIG. 2 is a perspective view of a radiant energy transmitting path which may be advantageously employed in the system of the present invention.

FIG. 2 illustrates, in perspective, a typical assembly of the first and second transducers as employed in a preferred embodiment of the present invention and the radiant energy transmitting path which is completed between the first and second transducer. A gallium arsenide diode is shown generally at 24 receiving its electrical input signals through the leads 25 and 26. Multiple vanes of a heat sink 27 are arranged to efficiently dissipate the heat generated by the operation of the diode.

A radiant energy transmitting path 28 is positioned and disposed to receive the radiant energy output signals of the diode 24 and transmit them to a photo detector shown generally at 29. This may be of the silicon diode type as previously mentioned and transduces the radiant energy infrared invisible light rays received from the radiant energy path 28 to commensurately modulated electrical signals. The modulated electrical signals developed across the leads 30 and 31 are connected to a high-level amplifier of the type illustrated at 16 in FIG. 1 and operative at a relatively very high negative potential of the order of 15 to 40,000 volts.

It should be appreciated that the system of the present invention is not dependent for its operation upon the transmission of visible light and, in fact, the employment of a gallium arsenide transducer which converts electrical signals to commensurately modulated signals within the infrared spectrum is desirable not only for its bandwidth and response characteristics, but also for the fact that it minimizes the interference which might otherwise be troublesome because of interfering ambient light conditions.

Accordingly, the present invention should not be confused with certain prior art systems which employed fiber optics and light to transmit signals of different colors, i.e., wavelengths down a single optical path employing filters to separate the several different signals at selected terminal points. It will be readily appreciated by those skilled in the art that the objective of the present system is to provide isolation between a low-level input circuit and a high-level output circuit having a potential difference which may be of the order of 40,000 volts. One of the prime considerations, therefore, in the concept of the present invention, is to provide such complete electrical, capacitive, and electromagnetic isolation while affording the maximum realizable bandwidth and speed of response to transmit the modulating signals faithfully over the isolation link.

Obviously many modifications and variations of the present invention are possible in the light of the above teachings. It is, therefore, to be understood that within the scope of the disclosed concept, the invention may be practiced otherwise than as specifically described.

What is claimed is:

1. A system for modulating the control electrode of a cathode ray tube comprising:
 a source of electrical signals modulated about a low-level potential;
 an input circuit including said control electrode operatively connected to a very high DC potential source, said high DC potential having an amplitude of the order of at least 5,000 volts more than said low-level potential;
 a first broadband transducer means operative at said low-level potential for converting said electrical signals to commensurately modulated broadband signals of radiant energy;
 a radiant energy transmitting path having one end positioned to receive said modulated signals of radiant energy;
 a second transducer means positioned at the terminal end of said radiant energy transmitting path for receiving said modulated broadband signals of radiant energy, said second transducer means being operative for producing broadband electrical signals modulated in accordance with the modulation of said signals of radiant energy; and
 means for impressing said broadband electrical signals upon said control electrode for modulating the high DC potential of said input circuit.

2. A modulation system as claimed in claim 1, wherein the anode of said cathode ray tube is operated at substantially ground potential.

3. A modulation system as claimed in claim 1 wherein said transducers are operative in the non-visible light regions.

4. A modulation system as claimed in claim 1 wherein said radiant energy signals are within the infrared spectrum.

5. A modulation system as claimed in claim 4, wherein said first transducer is a gallium arsenide infrared source.

References Cited

UNITED STATES PATENTS

| | | | |
|---|---|---|---|
| 2,506,672 | 5/1950 | Kell et al. | |
| 2,987,649 | 6/1961 | Watson | 315—30 |
| 3,346,811 | 10/1967 | Perry et al. | 324—96 |

ROBERT L. GRIFFIN, Primary Examiner

R. L. RICHARDSON, Assistant Examiner

U.S. Cl. X.R.

250—199, 227; 315—30